Figure 1:
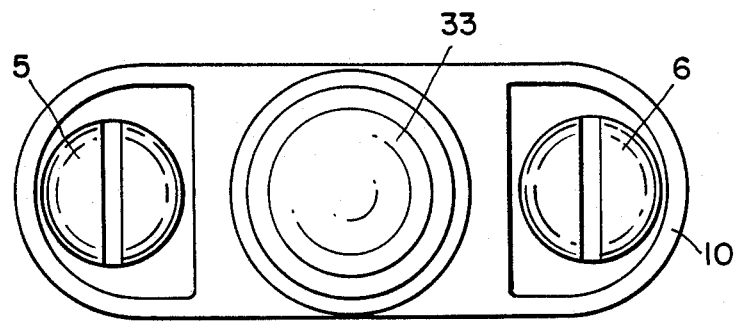

United States Patent [19]

Baggett et al.

[11] Patent Number: 4,823,727
[45] Date of Patent: Apr. 25, 1989

[54] PRESSURE INDICATOR

[75] Inventors: David Baggett, Newcastle upon Tyne; Alan Bateman, Washington; Colin T. Billet, Durham, all of England

[73] Assignee: Domnick Hunter Filters Limited, Birtley, England

[21] Appl. No.: 153,225

[22] Filed: Feb. 8, 1988

[30] Foreign Application Priority Data

Feb. 10, 1987 [GB] United Kingdom ............. 8702897

[51] Int. Cl.⁴ .............................................. G01L 13/02
[52] U.S. Cl. ................................. 116/272; 116/268; 116/270
[58] Field of Search ............... 73/716, 756; 116/266, 116/268, 270, 272, 281, 283, DIG. 8, DIG. 25, DIG. 42, 34 R, 220; 411/395, 418–421

[56] References Cited

U.S. PATENT DOCUMENTS 2,156,350  5/1939  Olson ................................. 411/420
3,066,527 12/1962  Stein ......................... 116/DIG. 42
3,260,233  7/1966  Bergunder ..................... 116/34 R
3,779,080 12/1973  Smith ................................ 116/272
3,949,610  4/1976  Pietsch .............................. 116/270
4,445,457  5/1984  Bargman ........................... 116/268

FOREIGN PATENT DOCUMENTS 843129  8/1960  United Kingdom ............... 411/419
929085  6/1963  United Kingdom .

Primary Examiner—William A. Cuchlinski, Jr.
Assistant Examiner—W. Morris Worth
Attorney, Agent, or Firm—Bert J. Lewen; Henry Sternberg

[57] ABSTRACT

A pressure indicator for use in a pneumatic circuit. A rolling diaphragm (14) is mounted within a housing (9,10) and divides the housing into first and second regions (15,16), one sealed from the other. The diaphragm has an outer sleeve section (18) and a connected inner cup section (19) lying within the outer sleeve section, the outer surface of the cup section and the inner surface of the sleeve section both being subject to pressure in the second region. An indicator (22) is seated within the cup section. The cup section is biased towards the first region against pressure therein, and into a position wherein the indicator lies substantially wholly within the cup section and is shielded from view thereby. The housing has a transparent section through which the indicator may be viewed as it moves out of the cup section in response to increasing pressure differential between the first and second regions.

7 Claims, 3 Drawing Sheets

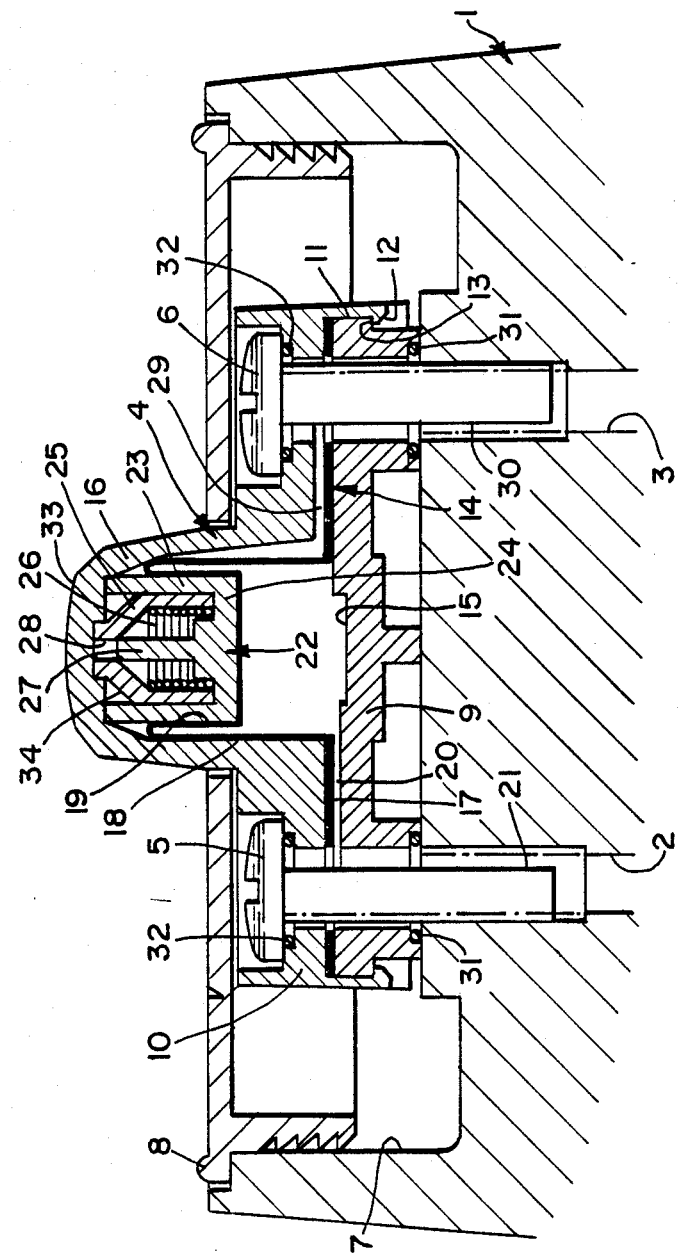

PRESSURE INDICATOR

This invention relates to pressure indicators, and particularly to the type of indicator that gives an immediate visual impression of pressure without the need to obtain dial readings.

A number of visual pressure indicators for pneumatic circuits are known, and it is usual in such indicators to employ a diaphragm capable of being subjected to different pressures on opposite sides of the diaphragm. Movement of the diaphragm in response to applied pressure acts through a linkage to move an indicator having areas of contrasting colour, so that the relative areas of exposed colours give a ready visual indication of the pressure condition.

Indicators of this type are complicated due to the presence of the linkage, and the present invention seeks to provide a simplified construction.

According to the invention a pressure indicator for use in a pneumatic circuit comprises a housing, a rolling diaphragm mounted within the housing and dividing the housing into first and second regions, one sealed from the other, the diaphragm having an outer sleeve section and a connected inner cup section lying within the outer sleeve section, the outer surface of the cup section and the inner surface of the sleeve section both being subject to pressure in the first region and the inner surface of the cup section and the outer surface of the sleeve section both being subject to pressure in the second region, an indicator seated within the cup section, an inlet into the first region, and means biasing the cup section towards the first region against pressure therein and into a position wherein the indicator lies substantially wholly within the cup section and is shielded from view thereby, the housing having a transparent section through which the indicator may be viewed as it moves out of the cup section in response to increasing pressure differential between the first and second regions.

It will be noted that the indicator is moved directly by the cup section of the diaphragm, without the need for any intervening linkage, thus giving a very reliable direct action combined with a simple construction. The area of indicator that is unshielded by the cup section of the diaphragm gives an immediate visual indication of the pressure condition, the area increasing as the pressure difference between the first and second regions increases.

Preferably the indicator comprises a hollow sleeve having an external diameter substantially equal to the diameter of the inner surface of the cup section, the sleeve having a closed end bearing on the base of the cup section and an opposite open end, and the biasing means is a compression spring bearing at one end thereof on the closed end of the sleeve.

Other constructions of the indicator are possible, but this arrangement again leads to simple construction.

The other end of the compression spring is desirably retained in a spring holder secured in the housing, and the spring holder is preferably axially aligned with the hollow sleeve section of the indicator and fits within the hollow sleeve section of the indicator to act as a guide for the indicator during its movement out of the cup section.

The guiding effect of the spring holder improves the stability of the indicator along its path of movement. In such arrangement the indicator will be of a different colour from the spring holder so that the respective areas of exposed colours as viewed through the transparent section of the housing will give the desired indication.

The indicator of the invention may readily be manufactured as a self-contained unit capable of being secured by bolts to a pneumatic circuit element. The construction is desirably such that at least one of the bolts has a axial cut-away section through which communication may, be established between the pneumatic circuit and the first region of the indicator. If differential pressure between two parts of the pneumatic circuit is to be indicated, then both bolts will have cutaway sections, communicating with respective parts of the pneumatic circuit and leading respectively into first and second regions of the indicator.

Figure 2:
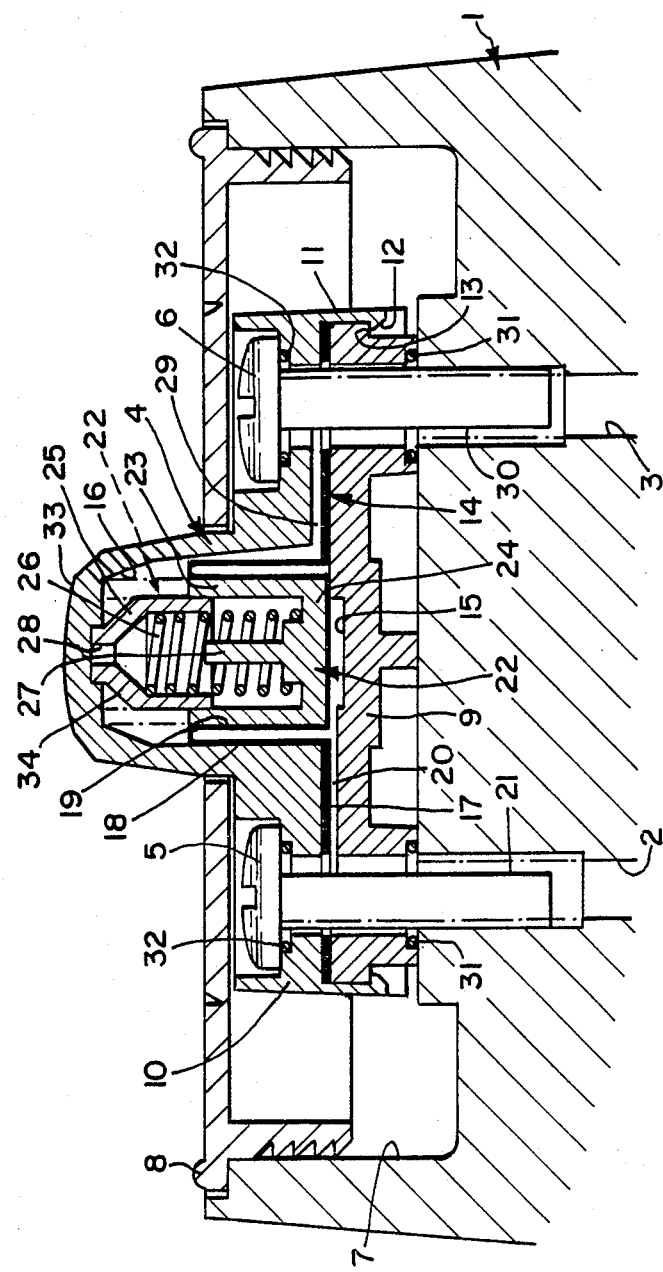

In order that the invention may be better understood a specific embodiment of an indicator in accordance therewith will now be described in more detail, by way of example only, with reference to the accompanying drawings in which, FIG. 1 is a plan view of the indicator;

FIG. 2 is a sectional view through the indicator when installed on a pneumatic circuit element; and FIG. 3 is a view similar to that of FIG. 2, but showing the indicator in a different condition of operation.

Referring to the drawings there is shown a pneumatic circuit element 1 having passages 2 and 3 which communicate with different parts of a pneumatic circuit through the element. A pressure indicator generally shown as 4 is secured to the element 1 by bolts 5 and 6, the function of the indicator being to indicate differential pressure between the two parts of the circuit to which passages 2 and 3 are connected. The indicator 4 is received in a well 7 in an upper surface of the element 1, the well being closed by a cover plate 8 through which a dome section of the indicator projects.

The indicator itself comprises a lower housing part 9 and an upper housing part 10, each of which may conveniently be injection moulded from a suitable plastics material. The housing part 10 is transparent. The housing part 10 has a depending skirt 11 which carries in-turned clips 12, which may be snapped into position beneath a shoulder 13 on the lower housing part 9 in order to hold the two parts together.

Sandwiched between the parts 9 and 10 is a rolling diaphragm 14 that divides the space within the housing into first and second regions 15 and 16, one sealed from the other. The diaphragm has a planar section 17 connected to an upwardly extending outer sleeve section 18 which in turn is connected to an inner cup section 19. The inner surface of the sleeve section 18 and the outer surface of the cup section 19 are each exposed to the first region 15, and that region is connected to the passage 2 by means of a groove 20 formed in the upper surface of the housing part 9 and a flat cut-away section 21 extending axially along the bolt 5.

An indicator 22 is seated within the cup section 19, the indicator comprising a hollow sleeve 23 having a closed end 24 bearing on the base of the cup section.

A spring holder 25 is secured, for example by adhesive, to the dome of the upper housing part 10, and a compression spring 26 lies between the spring holder and the closed end 24 of the sleeve 22. The spring acts to bias the cup section 19 towards the first region 15, into the position shown in FIG. 2 wherein the indicator 22 lies substantially wholly within the cup section and is shielded from view thereby. The spring holder 25 is axially aligned with the hollow sleeve section 23 of the indicator and fits within that hollow sleeve section to act as a guide for the indicator during upward movement thereof.

The indicator has a central projection 27 upstanding from the closed end 24, and the spring holder 25 has a central recess 28 into which the projection 27 may be received. The spring holder 25 and the indicator 22 are manufactured from different coloured materials. It will be seen that the indicator, and hence the inner surface of the cup section, is subject to the pressure within the second region 16, which is connected to the passage 3 by way of a groove 29 formed in the lower surface of the upper housing part 10 and a flat cut-away section 30 extending axially of the bolt 6.

Following manufacture of the indicator the parts are held in their assembled condition by the inter-engagement of the rim 12 and shoulder 13. On installation of the indicator as shown in FIG. 2 the bolts 5 and 6 are screwed firmly into position, so completing the clamping and sealing of the diaphragm 14 between the housing parts 9 and 10. Sealing rings 31 are incorporated into the lower surface of the lower housing part 9 and sealing rings 32 are incorporated into the upper surface of the upper housing part 10, those rings serving to effect the necessary seals around the bolts 5 and 6.

In operation, in the absence of a differential pressure between channels 2 and 3 that is sufficient to overcome the force of the spring 26, the parts will be in the relative positions shown in FIG. 2. The indicator will be concealed from view through the dome 33 of the housing 10 by the diaphragm. As the pressure excess from region 15 to region 16 increases the cup section of the diaphragm will move upwardly, the diaphragm rolling between the cup section and the outer sleeve section. This movement will cause the indicator to be raised, and an increasing area of the indicator will become visible through the dome 33, with a corresponding reduction in the visible area of the spring holder 25. The contrasting colours of these two parts thus gives an immediate visual indication of the pressure difference. At maximum pressure difference the indicator will lie in the position shown in FIG. 3, and it will be seen that the spring holder 25 is then completely shielded from view through the sides of the dome 33. In addition, the projection 27 lies within the opening 28 so that indicator colour rather than spring holder colour is visible through the top of the dome. In order to give yet further visibility of indicator colour it may be desirable to silver the frustoconical surface 34 of the spring holder so that indicator colour will also be reflected through the remainder of the top of the dome. In the position of maximum differential pressure, therefore, the view through the dome will be almost entirely of indicator colour.

Although the description has been written in terms of pressure applied to both the first and second regions, it will be appreciated that the device may also be used as a vacuum indicator. In this case the first region 15 will be exposed either to atmosphere or to a lower vacuum and the second region 16 will be exposed to a higher vacuum.

It will be understood that numerous modifications may be made to the indicator as described in the drawings. If this is not desired to indicate differential pressure then the groove 29 and axial flat 30 on the bolt 6 will be omitted, and only the first region 15 will be subjected to system pressure. A bleed to atmosphere from the second region may then be incorporated in order to give a full range of movement of the indicator.

The connections from the first and second regions formed by the grooves and the flat sections of the bolts may be replaced by any other suitable forms of connection. The detailed construction of the indicator and the spring holder may similarly be changed.

We claim:

1. A self-contained pressure indicator for connection to a pneumatic circuit element, the indicator comprising a housing, a rolling diaphragm mounted within the housing and dividing the housing into a first outer region and a second inner region, one sealed from the other by said diaphragm, said diaphragm having an outer sleeve section and an inner cup section connected to and lying within the outer sleeve section, an outer surface of the diaphragm being contiguous with and subject to pressure in the first region and an inner surface of the diaphragm being contiguous with and subject to pressure in the second region, an indicator means seated within the cup section, an inlet into the first region, means biasing the cup section towards the first region against pressure therein and into a position wherein the indicator means lies substantially wholly within the cup section and is shielded from view thereby, the housing having a transparent section through which the indicator means may be viewed as it moves out of the cup section in response to increasing pressure differential between the first and second regions, and first and second bolts passing through respective first and second bolt holes in the housing for engagement with respective bolt-receiving sections of the pneumatic circuit element, at least the first bolt having an axial cut-away section opening into the first outer region of the housing for allowing communication between said first outer region and a first part of a pneumatic circuit comprised within the pneumatic circuit element.

2. A pressure indicator according to claim 1 in which the indicator means comprises a hollow sleeve having an external diameter substantially equal to the internal diameter of the cup section, the hollow sleeve having a closed end bearing on the base of the cup section and an open end opposite said closed end; and the biasing means is a compression spring within said hollow sleeve bearing at one end thereof on the closed end of the hollow sleeve.

3. A pressure indicator according to claim 2 in which the other end of the compression spring is retained in a spring holder secured to the housing.

4. A pressure indicator according to claim 3 in which the spring holder is axially aligned with and fits within the hollow sleeve to act as a guide for the hollow sleeve during its movement out of the cup section.

5. A pressure indicator according to claim 4 in which the hollow sleeve is of a different color from the spring holder.

6. A pressure indicator according to claim 4 in which the hollow sleeve has an internal central projection upstanding from the closed end thereof, and the spring holder has a central recess into which the central projection may be received.

7. A pressure indicator according to claim 1 in which the second bolt has a cut-away section allowing communication between a second part of the pneumatic circuit and the second inner region of the housing.

* * * * *